United States Patent
Stefan et al.

(10) Patent No.: US 10,789,787 B2
(45) Date of Patent: Sep. 29, 2020

(54) METHOD AND SYSTEM FOR REMOTE CONTROL OF MOTOR VEHICLES

(71) Applicant: Ford Global Technologies, LLC, Dearborn, MI (US)

(72) Inventors: Frederic Stefan, Aachen (DE); Uwe Gussen, Huertgenwald (DE); Christoph Arndt, Rheinland-Pfalz (DE); Rainer Busch, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1637 days.

(21) Appl. No.: 14/162,565

(22) Filed: Jan. 23, 2014

(65) Prior Publication Data
US 2014/0207535 A1 Jul. 24, 2014

(30) Foreign Application Priority Data

Jan. 24, 2013 (DE) .................. 10 2013 201 168
Jan. 24, 2013 (DE) .................. 10 2013 201 169

(51) Int. Cl.
*G07C 5/00* (2006.01)
*G05D 1/00* (2006.01)

(52) U.S. Cl.
CPC .......... *G07C 5/008* (2013.01); *G05D 1/0022* (2013.01); *G05D 1/0088* (2013.01); *G05D 2201/0213* (2013.01)

(58) Field of Classification Search
CPC ............................................... G06Q 10/06398
USPC ......................................................... 705/7.42
See application file for complete search history.

(56) References Cited

U.S. PATENT DOCUMENTS

| 5,263,396 | A | 11/1993 | Ladan et al. |
| 5,552,789 | A | 9/1996 | Schuermann |
| 5,815,822 | A | 9/1998 | Iu |
| 5,942,979 | A | 8/1999 | Luppino |

(Continued)

FOREIGN PATENT DOCUMENTS

| CA | 2352165 A1 | 4/2000 |
| CN | 102455699 A | 5/2012 |

(Continued)

OTHER PUBLICATIONS

Campos et al. (A reference architecture for remote diagnostics and prognostics applications, Campos et al., Proceedings, IEEE Autotestcon, date of conference Oct. 17-17, 2002, Date published IEEE Dec. 10, 2002).*

(Continued)

*Primary Examiner* — Matthew D Henry
(74) *Attorney, Agent, or Firm* — Brooks Kushman PC; Frank MacKenzie (57) ABSTRACT

A system and method for demand-activated remote monitoring and/or control of motor vehicles via a radio data communication link with a coordination unit. The coordination unit is configured for conveying requests for remote monitoring and/or remote control of a motor vehicle and offers for performing the remote control from control terminals located remotely from the coordination unit. After acceptance of an offer by the vehicle, the coordination unit provides a data communication link between the motor vehicle and the control terminal over which the remote control and/or monitoring is performed.

6 Claims, 4 Drawing Sheets

(56) References Cited

U.S. PATENT DOCUMENTS

| | | | |
|---|---|---|---|
| 6,304,290 B1 | 10/2001 | Bailly | |
| 6,803,854 B1 | 10/2004 | Adams et al. | |
| 7,042,993 B2 | 5/2006 | Benini et al. | |
| 7,196,612 B2 | 3/2007 | Sumada et al. | |
| 7,397,344 B2 | 7/2008 | Nantz et al. | |
| 8,903,587 B2 | 12/2014 | Hattori | |
| 2002/0027523 A1* | 3/2002 | Muramatsu | B60R 25/00 342/357.57 |
| 2005/0068191 A1 | 3/2005 | Eschke et al. | |
| 2007/0288127 A1* | 12/2007 | Haq | B60R 25/00 701/2 |
| 2008/0048844 A1 | 2/2008 | Watanabe et al. | |
| 2008/0266051 A1* | 10/2008 | Taki | B60R 25/2009 340/5.1 |
| 2009/0171555 A1* | 7/2009 | Hyde | F02D 41/021 701/115 |
| 2010/0030434 A1* | 2/2010 | Okabe | A61B 5/165 701/48 |
| 2012/0066026 A1* | 3/2012 | Dusig | G06Q 30/02 705/7.32 |
| 2012/0226528 A1* | 9/2012 | Warda | G06Q 10/00 705/7.38 |
| 2013/0046421 A1 | 2/2013 | El Fassi et al. | |

FOREIGN PATENT DOCUMENTS

| | | |
|---|---|---|
| CN | 102862568 A | 1/2013 |
| DE | 69501130 T2 | 3/1998 |
| DE | 69513124 T2 | 8/2000 |
| DE | 19914829 A1 | 1/2001 |
| DE | 10115315 A1 | 10/2001 |
| DE | 10154400 A1 | 5/2003 |
| DE | 10225787 A1 | 12/2003 |
| DE | 10328090 A1 | 12/2004 |
| DE | 69532935 T2 | 4/2005 |
| DE | 10346888 A1 | 5/2005 |
| DE | 102005063068 A1 | 7/2006 |
| EP | 0419897 A2 | 4/1991 |
| WO | 2002052832 A2 | 7/2002 |
| WO | 2003024746 A1 | 3/2003 |
| WO | 2006075489 A1 | 7/2006 |
| WO | 2009043650 A1 | 4/2009 |
| WO | 2011116837 A1 | 9/2011 |

OTHER PUBLICATIONS

Office Action for Chinese Application No. 201410035152.5, dated Jan. 22, 2018, 5 Pages.

Gnatzig, Sebastian et al., Human-Machine Interaction as Key Technology for Driverless Driving—A Trajectory-Based Shared Autonomy Control Approach, ZYVEX Technologies, Sep. 2012, pp. 913-918.

Ferworn Alexander et al., IP mobility issues for a mobile telerobotic system-NEPWAK, International Journal of Automation and Computing, vol. 1, Jul. 2004, 7 pages.

European Patent Office, Search Report dated Jul. 8, 2014 for the corresponding German Patent Application No. 14151308.5, 7 pages.

German Patent and Trademark Office, Examination Report dated Dec. 22, 2015 for the corresponding German Patent Application No. 10 2013 201 169.5, 6 pages.

Chinese Office Action dated Aug. 2, 2017 for the corresponding Chinese Application No. 201410035152.5.

Nusca, Andrew, GM's OnStar Remote Vehicle Slowdown Feature Stops Carjacking, ZDNet, dated Oct. 21, 2009, 14 pages.

Unmanned Aerial Vehicle dated Sep. 12, 2012, Wikipedia, 19 pages.

Woodyard, Chris, Device Can Remotely Halt Auto Chases, USA Today, ABC News dated Feb. 12, 2009, 2 pages.

* cited by examiner

METHOD AND SYSTEM FOR REMOTE CONTROL OF MOTOR VEHICLES

CROSS-REFERENCE TO RELATED APPLICATIONS

This application claims foreign priority benefits under 35 U.S.C. § 1119(a)-(d) to DE 10 2013 201 168.7 filed Jan. 24, 2013 and DE 10 2013 201 169.5 filed Jan. 24, 2013, the disclosures of which are hereby incorporated by reference it their entirety.

TECHNICAL FIELD

The invention relates to a demand-activated remote control system for motor vehicles via a radio data communication link with a central coordination unit.

BACKGROUND

There may be situations in which the driver of a motor vehicle wishes that someone would take over control of the motor vehicle or the motor vehicle would drive automatically.

In the text which follows, some cases will be described in which autonomous or partially autonomous driving of the motor vehicle would be desirable for reasons of comfort or for practical reasons. In the case of very long routes, drivers must have breaks and possibly even stay overnight en route, typically truck drivers or also car drivers on the way to a holiday. Inexperienced and young drivers can be stressed or even overextended in certain traffic situations or on their first long trip. Elderly people, people impaired by illnesses or the like are possibly exposed to a higher risk of becoming mentally absent during the driving which increases the risk of accidents. Temporarily impaired or handicapped people are possibly also temporarily unable to properly guide motor vehicles. Rental car or car sharing drivers are in most cases forced to fetch their own vehicles and bring them back later from locations and to locations far away from their home location. When drivers arrive at home late in the evening they will sometimes find a free parking space only far away from home. During night trips, drivers may become tired which can cause accidents. A driver may have to care for a child on the rear seat. A driver could have an allergic or epileptic attack during a trip. A driver could receive an important telephone call during the trip but would not like to be in breach of prohibitions on telephone use while driving.

In most of these situations, the driver would have to stop or exchange the driver's seat with a passenger which, however, is not always possible for safety, time or availability reasons. In the prior art, many systems have been proposed which aid drivers in such situations. Such systems can simply instruct the driver to stop now or partially take over control of the vehicle (e.g. adaptive cruise control in conjunction with automatic tracking system) or take over control of the vehicle completely (in the manner of an autopilot).

However, autonomous vehicle operation under computer control faces many technical hurdles and regulatory issues, and it may be some time before motor vehicle autopilots will be capable of handling a large range of driving situations and unexpected situations in the way that humans can. In addition, motor vehicle autopilots may require vehicle-to-vehicle communication and a corresponding infrastructure which may not be available in all area.

DE 101 54 400 C2 discloses a generic remote control system for motor vehicles, namely a monitoring and control system for manned vehicles, especially for aircraft which can be controlled remotely from a ground station in emergency cases. Once activated, the remote control can only be deactivated again under special conditions.

EP 0 419 897 A2 discloses a remote control system for fighting vehicles which can be optionally deactivated in order to hand the control over to the crew of the fighting vehicle.

The demand-activated remote control systems for vehicles known in the prior art are generally too complex to be considered for motor vehicles because a stationary device would always have to keep immense capacities of hardware and software and of personnel available for its remote control.

SUMMARY

The invention is based on the object of providing a demand-activated remote monitoring and control system for motor vehicles which can be implemented and operated with relatively little effort so that it can also operate profitably with a comparatively small number of customers, and which can easily keep pace with an increasing number of customers.

According to an embodiment, a central coordination unit conveys requests for remote monitoring and/or remote control of a motor vehicle and offers for performing the remote monitoring and/or control by operator persons to control terminals located remotely from the coordination unit. After acceptance of an offer, the coordination unit establishes a data communication link between the motor vehicle and the control terminal from which the offer originates. I.e., the coordination unit is responsible for the coordination and communication between remotely monitored or remote-controlled motor vehicles, the drivers of those motor vehicles and persons or driving agent programs as operators.

A control terminal enables the operator person active on it to perform the remote monitoring and/or remote control of the motor vehicle via the data communication link established by the central coordination unit in the manner of drive simulation computer games, i.e. with a screen view of the motor vehicle dashboard with the most important instruments, a view which can also be simulated graphically, and with a screen view of the real scenery in the direction of driving and in the rear view mirrors and with control options via video and/or audio interfaces of the data terminal, in the context of which, however, the control commands do not control a virtual motor vehicle but the real motor vehicle.

The remote monitoring and/or remote control in the manner of drive simulation computer games from remote control terminals makes it possible, with relative ease of obtaining persons, to offer oneself as operator persons or virtual taxi drivers which, naturally, may require certain prerequisites with regard to driving license/certification, local knowledge, practical driving experience and the remote control program or drive simulation computer game used. The expenditure for implementing the method is essentially restricted to the provision of the coordination unit and the software for the motor vehicles and control terminals. This service can also be provided as paid service by companies or individual persons.

A request for remote monitoring can consist in initially only monitoring the operation of the motor vehicle and/or of the driver, especially for the duration of a particular situation or of a problem, and in the case where an incapability of the driver of reliably driving the vehicle is recognized, in controlling the motor vehicle remotely, e.g. up to a safe standstill or up to a predetermined destination or into a hospital.

A request for remote control can include, e.g., to control the motor vehicle remotely for a certain time or traveling distance during which the driver would like to deal with something else than driving, or to control the motor vehicle remotely to a destination after the driver has left it.

In a preferred embodiment, the motor vehicle has drive-by-wire controls which provide for control of the motor vehicle remotely by means of electrical signals, and a data processing device in which software provided or authorized by the coordination unit for conveying requests for remote monitoring and/or remote control to the coordination unit and for performing the remote control from a remote control terminal is installed.

The control terminal may be a private device such as an all-purpose computer for end users, especially a PC with screen and input devices, on which software, provided or authorized by the central coordination unit, for receiving requests for remote monitoring and/or remote control from the coordination unit, for conveying offers for remote monitoring and/or remote control to the coordination unit and for performing the remote control via the data communication link provided is installed.

The demands for precision in remote control are relatively low in the system according to the invention, much lower than in the case of an aircraft. In a particularly simple system version, it may be sufficient to be able to steer and brake the motor vehicle from a distance in order to be able to stop it safely. In a version which is only slightly more complex, accelerating and possibly gear changing can also be added in order to be able to drive the motor vehicle to a destination from a distance.

The remote monitoring and/or remote control can be performed optionally also, apart from operator persons, by driving agent programs, i.e. virtual drivers or off-board autopilots, a number of which are in each case preferably responsible for motor vehicles in a particular geographic region. Since these virtual drivers can easily exchange information about the observed situations with one another and can learn from one another, synergies are produced. When the motor vehicle passes into another geographic region, the remote monitoring and/or remote control is transferred automatically to another virtual driver responsible for it.

The remote control system may comprise a payment system for automatically handling the payment for utilizing services and a performance-related payment of operator persons. Users can have the option to select operator persons in accordance with criteria such as personal acquaintance, age, experience, price, etc.

A request for remote monitoring and/or remote control normally originates from the driver or his motor vehicle itself. In an embodiment, however, it can also be provided that someone else, e.g. a legal guardian of the driver, can request remote monitoring and/or remote control and then perform this himself. This is one of relatively few situations in which the driver cannot take over control of the vehicle again whenever desired.

The disclosed system can also comprise a device, installed in the motor vehicle, for automatically monitoring and evaluating the health-related (physical, mental, and/or emotional) state or constitution of the driver, which, if necessary, independently sends a request for remote control of the motor vehicle to the coordination unit.

The remote control system can also comprise a device for automatically evaluating the driving performance of operator persons, which performance can also be taken into consideration in the payment of the respective operator person. In addition, the health-related (physical, mental, and/or emotional) state of operator persons can be monitored in order to ensure that only alert and healthy operator persons are active.

A selection process of operator persons may be performed on the basis of criteria where the criteria can relate to correspondences with the driver such as acquaintances, driving style and/or personal attitudes, and/or a pre-selection of the driver, especially on the basis of lists of names, requirement profile of the operator and/or minimum requirements for the operator. By this means, the driver may make an in-advance selection of operators appearing suitable to him or, respectively, during the selection on the basis of lists of names, can also precisely specify who shall take over the vehicle.

Utilization of the disclosed system may be restricted, under certain circumstances, to particular locations, e.g. particular geographic regions for which sufficient operators are available, or to roads free of intersections for which remote control should be manageable most reliably.

The data communication link between the motor vehicle and the control terminal may be redundant, using parallel radio links for example, to achieve high levels of reliability.

The disclosed system is suitable for promoting the spread and acceptance of fully autonomous driving because drivers can first gain the experience and get used to handing over control of their vehicle at least in phases.

The disclosed system/method can be used for supporting many types of motor vehicles, e.g. trucks, buses, and passenger cars. It provides for remote support of beginner drivers, elderly persons, persons impaired by sickness or impediments and temporarily handicapped persons in that an operator can monitor the trip and, if necessary, can intervene in a correcting manner or take over control completely. The trip of an adolescent and/or beginner driver can also be monitored by a parent who can take over control of the vehicle if he assumes that the child is under the influence of alcohol or otherwise impaired. The system/method also provides a chauffeur service on demand for many situations in which the driver would like to pause or direct his attention to something else, and also for critical maneuvers. The system/method also makes it possible to have rental cars and the like fetched or brought back.

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
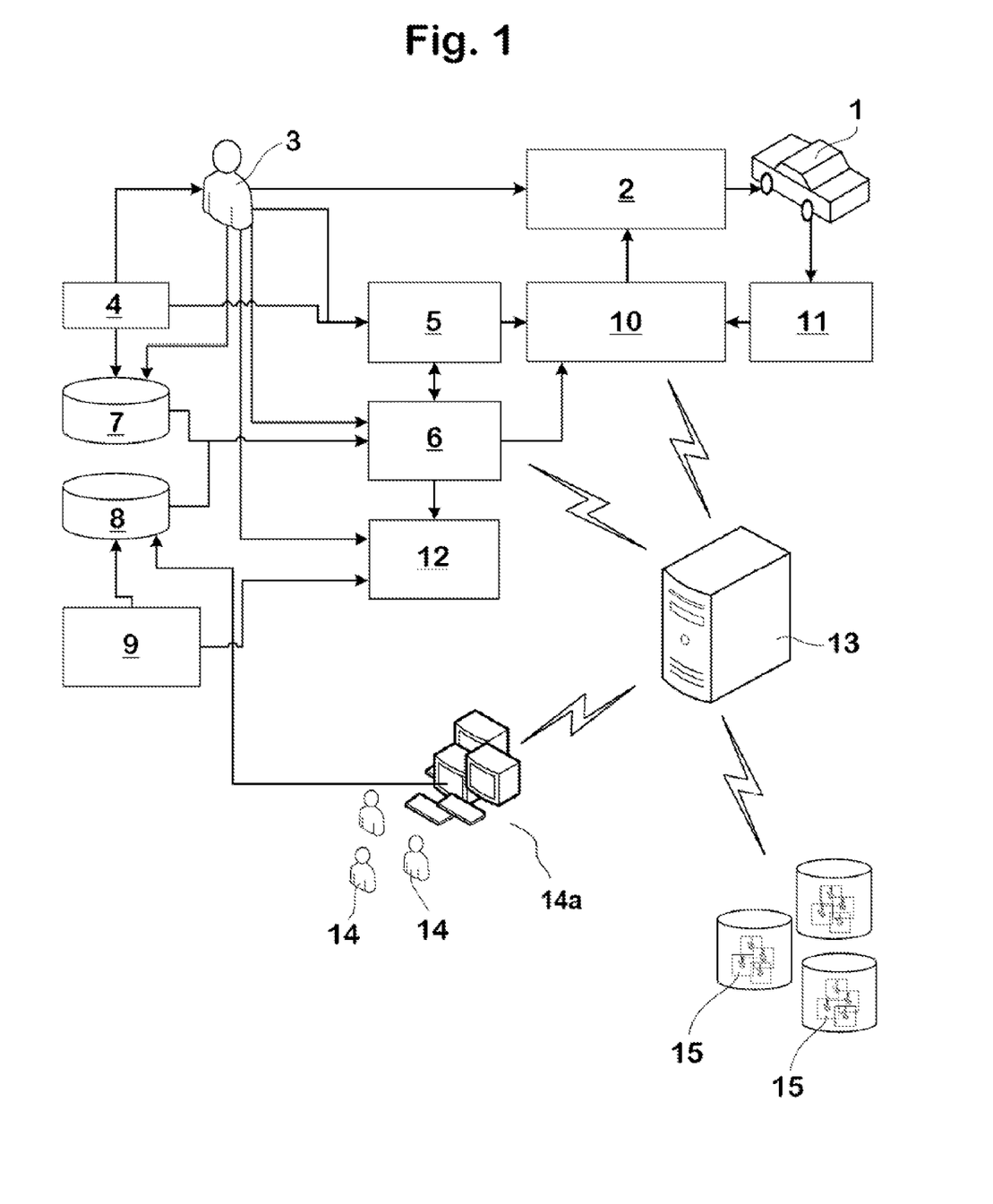
FIG. 1 shows a schematic block diagram of a demand-activated remote control system for motor vehicles.

In FIG. 1, a motor vehicle 1 contains a driver-vehicle interface 2 which allows a driver 3 of the motor vehicle 1 to control the motor vehicle 1. The driver-vehicle interface 2 comprises, for example, a steering wheel, pedals and a gear selector, and may deliver electrical signals corresponding to the positions of the operating elements for driving servo motors or electromechanical actuators which allow the motor vehicle 1 to respond to steering, braking and propulsion commands of the driver 3. That is to say, the motor vehicle preferably has a so-called drive-by-wire control which can be purely electrical, but can also have mechanical and/or hydraulic control elements acting in parallel for safety reasons.

Further operating elements can belong to the driver-vehicle interface 2, e.g. for an air conditioning system, windscreen heater, driver assistance systems, etc. The driver-vehicle interface 2 also comprises a man-machine interface such as, e.g., a screen, a voice communication module and the like.

A roadworthiness evaluation module 4 is configured for evaluating the health-related (physical, mental, and/or emotional) state of the driver 3, e.g. from the aspects of illness, tiredness, state of distraction, aggressiveness, stress, panic etc. In the art, various systems for automatically evaluating the health-related state of the driver of a motor vehicle are known, e.g. by means of voice analysis, breathing noise analysis, heart rate analysis, breathing gas analysis, eye movement analysis, analysis of data about the present road performance of the motor vehicle in conjunction with currently applicable traffic rules, etc.

When the roadworthiness evaluation module 4 determines a health-related state of the driver 3 which significantly impairs roadworthiness, it independently sends a command for remote monitoring or remote control of the motor vehicle 1 to a control transfer request module 5.

Such a command can consist, e.g., in requesting remote monitoring of the operation of the motor vehicle 1 and/or of the driver 3 and in critical cases or emergency cases in which a corresponding need for help of the driver 3 is found, also in requesting or allowing a remote control of the motor vehicle 1 if its necessity is determined due to the remote monitoring or if the driver 3 expresses a desire for remote control.

Remote monitoring or remote control of the motor vehicle 1 can be effected by a person or by software which is located at any other location than the motor vehicle 1 and, if it is effected by persons, it can be restricted to certain persons, e.g. to persons having suitable training and permission or to the parents of an adolescent and/or beginner driver in the case of which the roadworthiness evaluation module 4 has found an aggressive driving style, non-adherence to traffic rules and/or drinking of alcohol. After a corresponding notification, the parents can take over control of the motor vehicle 1, e.g. via a correspondingly configured computer 14a, and safely bring their child home.

The driver 3 can also issue a command for remote monitoring or remote control of the motor vehicle 1 directly to the control transfer request module 5 by operating a corresponding knob or a corresponding button on a screen, e.g. because he needs to care for a child on the back bench of the motor vehicle 1, because he would like to pick up an object which has fallen down in the motor vehicle 1 or because he would like to rest for a period without having to interrupt the trip.

The person or the software to remotely monitor or remotely control the motor vehicle 1 will be called remote operator here, for the sake of shortness. To select the remote operator, the control transfer request module 5 cooperates with an operator selection module 6 which selects the operator by means of criteria which may include, for example, any one or more of the following: The desired duration of remote monitoring or control; the availability of the operator; preferences of the driver 3 which are stored in a driver preference memory 7; the health-related state of the driver 3, determined by the roadworthiness evaluation module 4; a direct selection by the driver 3; any preset criteria for the case where the driver is not able to make a decision; and/or the history of previously selected operators and their performance.

The operator selection module 6 may call up one or more of the following data from the driver preference memory 7: Pre-settings carried out by the driver 3 with respect to a particular circle of persons from which an operator can be selected, e.g. persons personally known to the driver such as, e.g., family members; pre-settings performed by the driver 3 with respect to minimum qualifications of selectable operators, e.g. a minimum number of hours for which the operator has already been active monitoring or controlling remotely; and allocations as to which or what operator is to be selected under what circumstances (e.g. health-related impairment of the driver), which allocations may also exist for different drivers 3 when there are several drivers 3 authorized for driving the motor vehicle 1.

The histories of previously selected operators and their performance are recorded in an operator history memory 8. The operator history memory 8 receives data from an operator evaluation module 9 which has determined for each previously selected operator criteria such as, e.g., economy of driving style, softness of the driving style, adherence to traffic rules, correspondence of the driving style of the operator with the driving style preferred by the driver 3 (whether passively or whether dynamically, whether safety-conscious or whether destination-oriented) and the degree of attentiveness devoted by the operator to his task.

The request for remote monitoring or remote control of the motor vehicle 1 from the control transfer request module 5 and the selection of operator made by the operator selection module 6 are supplied to an interface 10 for remote monitoring and control which also receives from a vehicle status module 11 status data which represent the operating state and the environmental state of the motor vehicle 1, especially a camera image of the road in front of the motor vehicle 1, the current speed of the motor vehicle 1 and other data such as, e.g., the current settings of operating elements of the motor vehicle 1.

In addition to the interfaces, modules and memories, described above, the motor vehicle 1 contains an accounting module 12 in order to form the remote monitoring and control system described into a service which is usable for a fee if necessary. The provision of the hardware and software described in the text which follows, which is located remotely from the motor vehicle 1, and the activity of operator persons is paid in this case by drivers 3 who use the service when and only as long as they use it. The prices can be, e.g., kilometer and/or minute prices graded in accordance with range and quality of the requested remote monitoring or control. If operator persons receive a percentage of this, they have a good motive for rendering good work which provides drivers 3 with additional safety. Naturally, the option can also be provided of paying for a service packet in advance or obtaining it as a gift sample, in which case the accounting module 12 decrements the credit balance whilst the service is being used.

Remotely from the motor vehicle 1, there is a coordination unit 13 which is in data communication via radio with the motor vehicle 2, especially with the operator selection module 6, the interface 10 for remote monitoring and control and the accounting module 12. The coordination unit 13 is, e.g., a server which communicates, e.g., via mobile Internet or mobile radio with the motor vehicle 1 and also by cable or radio with operators who can be either persons 14 at some computers 14a or driving agent programs 15 in any computers.

When the coordination unit 13 receives a request for remote monitoring or remote control of the motor vehicle 1, it starts a pre-selection process and names the available operators to the operator selection module 6. After a final selection of the operator by the operator selection module 6 and/or the driver, the operator is requested to perform, coordinated by the coordination unit 13, the remote monitoring or remote control of the motor vehicle 1 via its interface 10 for remote monitoring and control.

Persons 14, as remote operators, can be located at any location where they can perform by means of a suitable terminal such as, e.g., a computer 14a on which suitable software is running the remote monitoring or remote control of the motor vehicle 1. This software can have a similar image, i.e. a screen view of the motor vehicle dashboard and of the scenery in the direction of driving and in the rear view mirrors, and control options via video and/or audio interfaces like drive simulation computer games in order to provide for remote monitoring or remote control of the motor vehicle 1. Easy operability and realistic remote control of the motor vehicle 1 becomes possible if the terminal also has special hardware which replicates operating elements of a motor vehicle realistically as is also known for drive simulation computer games or motor vehicle video games.

It can be provided that, in principle, anyone can apply to become an operator, especially as a free staff member booking on a fee basis, but there can be restrictions to the effect that only persons with particular prerequisites with regard to driving license and experience for remote monitoring or remote control are allowed to do this and/or it can be demanded that applicants successfully pass special training particularly for the remote control of motor vehicles or certain motor vehicle types. Operator persons 14 are thus a type of virtual taxi drivers.

Via the coordination unit 13, the operator history memory 8 can receive information about an operator person 14 as indicated diagrammatically by means of an arrow.

Instead of a person 14 as operator, one of the driving agent programs 15 can also be selected for monitoring or controlling the travel of the motor vehicle 1 and/or the driver 3 from a distance. Such a driving agent program 15 is a type of autopilot which, however, is not located in the motor vehicle to be controlled such as present systems for autonomous driving but on one or more remote servers.

It is proposed that each driving agent program 15 or in each case a group of driving agent programs 15 are only responsible for a particular geographic region and/or for particular motor vehicle types. When a motor vehicle 1 driving under control of a driving agent program 15 leaves the geographic region allocated to this program, another driving agent program 15 responsible for the new region takes over control. If a number of driving agent programs 15 are responsible for a particular geographic region, which in each case have control over another driving motor vehicle, driving agent programs 15 can exchange information with one another without needing direct vehicle-vehicle communication. Driving agent programs 15 can be provided with learning algorithms which improve their performance with increasing operating time.

Figure 2:
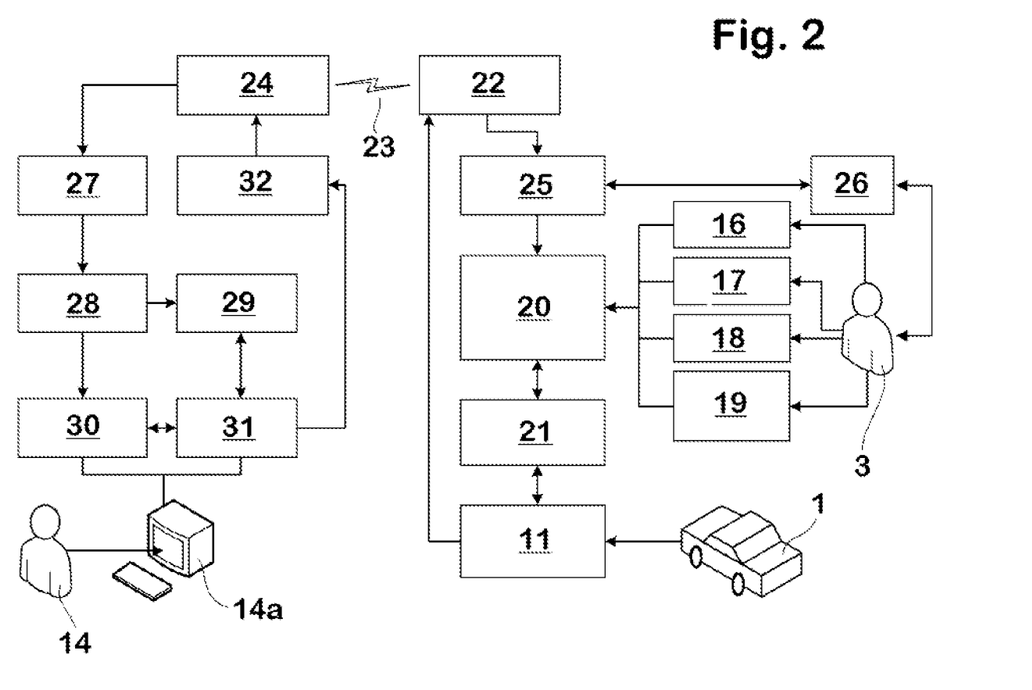
FIG. 2 shows a schematic block diagram of a demand-activated remote control system similar to that of FIG. 1, but some blocks being omitted or added or further subdivided in order to illustrate the remote control functions and their interface in greater detail.

In FIG. 2, the motor vehicle 1 contains as the driver-vehicle interface 2 of FIG. 1 a steering wheel 16, pedals 17, a gear selector 18 and further operating elements 19 such as, e.g., for vehicle illumination, air conditioning system, windscreen heater, driver assistance systems such as adaptive cruise control etc., which deliver electrical signals which, after adaptation to the existing vehicle control elements in a command arbitration module 20, are supplied to a vehicle control module 21 for servo motors or electromechanical actuators which allow the motor vehicle 1 to respond to the steering, braking, propulsion and other commands of the driver 3 as desired.

The vehicle control module 21 sends to the vehicle status module 11 status data which represent the nominal operating state of the motor vehicle 1, especially the instantaneous operating requirements by means of the operating elements 16-19, and receives from the vehicle status module 11 status data which represent the actual operating state of the motor vehicle 1, especially its longitudinal and lateral speeds and accelerations, engine speed, current range (fuel and battery capacity), power status of the lighting, etc.

The vehicle control module 21 acquires further status data such as, e.g., camera images of the road primarily before but possibly also next to and behind the motor vehicle 1, relative positions of other traffic users detected in the camera images, vehicle-to-vehicle information and weather conditions in the vehicle environment, and sends these together with the status data which represent the actual operating state of the motor vehicle 1 via a vehicle radio communication module 22 by radio communication 23 to a radio communication module 24 of the coordination unit 13 of FIG. 1. The radio communication 23 provides for communication between the driver 3, the motor vehicle 1 and an operator person 14 or his computer 14a, respectively. The radio communication 23 must be reliable and fast enough to ensure continuous remote monitoring or remote control, respectively.

The vehicle radio communication module 22 and a remote control command decoder 25 form the interface 10 for remote monitoring and control shown in FIG. 1. A remote control command decoder 25 can receive driving commands from an operator person 14 via the radio communication modules 22 and 24 and supply them to the command arbitration module 20.

A man-machine interface 26 such as, e.g., a touchscreen, a voice communication module and the like enables the driver 3 to activate remote vehicle monitoring or control by an operator person 14, to select an operator person 14, to confirm an accounting for services rendered and to terminate the remote vehicle monitoring or control.

With the exception of the radio communication module 24, there are the aforementioned blocks of FIG. 2 in the motor vehicle 1 or in an on-board computer thereof.

On the operator side, i.e. in or on a PC or similar computer 14a of a person 14 acting as operator, there is a status extraction module 27 in which the status data, i.e. the nominal and actual operating states of the motor vehicle 1, from which signals received by the radio communication module 24 are obtained. The status data are edited in a vehicle status preparation module 28 in a manner which allows a representation suitable or optimal for the operator person 14 and are then also supplied to a haptic emulation module 29 and a vehicle driving simulator module 30.

The haptic emulation module 29 is optional and is only necessary or only active if an operator person 14 working from home has an advanced driving simulator with steering wheel and pedal hardware which can emulate, e.g., steering resistances, pedal pressures, vehicle accelerations etc.

The vehicle driving simulator module 30 contains one or more remote control driving simulation programs which can be provided or tailor-made in each case for particular types of motor vehicles 1, and communicates with a remote control command interface 31 which enables the operator person 14 to remotely monitor or remotely control the motor vehicle 1. In a basic program version it is possibly sufficient to control the motor vehicle 1 by mouse, keyboard or some type of joystick as in many of today's video games. Optimal would be a motor vehicle cockpit replica with actuators which simulate a steering wheel, driving pedals and possibly a gearshift and which would allow a very realistic remote control of the remote motor vehicle 1 which would give the operator person 14 the feeling of sitting in the motor vehicle 1 himself. Such interactive and haptic motor vehicle cockpit replicas already exist today for motor vehicle video gamers.

Commands which the operator person 14 has entered into the remote control command interface 31 are brought into a suitable format in a remote control command coder 32 and then sent back to the radio communication module 22 of the motor vehicle 1 via the radio communication module 24 of the coordination unit 13 and via the radio communication 23.

Figure 3:
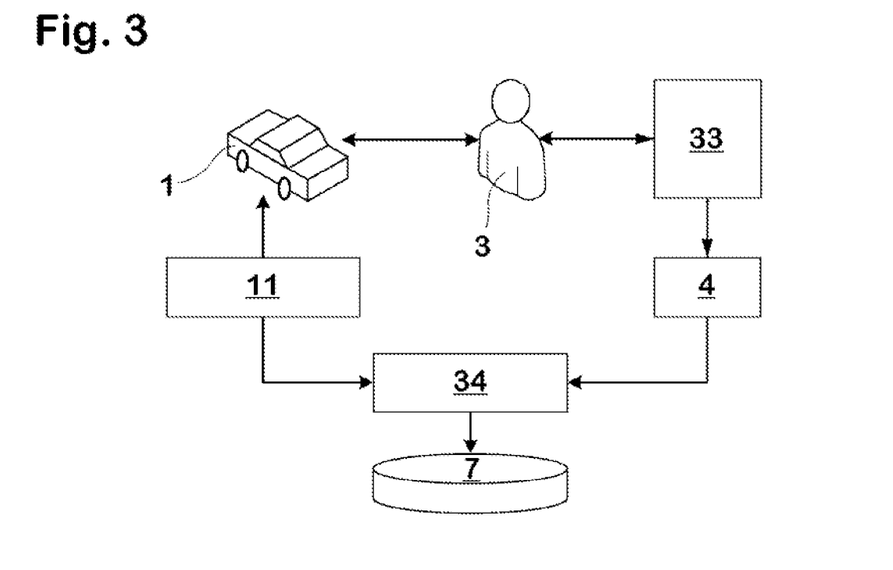
FIG. 3 shows a schematic block diagram for further illustration of the monitoring of roadworthiness and the determination of driver preferences.

The monitoring of the roadworthiness and the determination of preferences of the driver 3 will now be explained in greater detail by means of FIG. 3.

The roadworthiness evaluation module 4 evaluates the health-related (physical, mental, and/or emotional) state of the driver 3 by analyzing the signals from sensors 33 which monitor the driver 3, e.g. camera, microphone, seat sensor etc.

The roadworthiness evaluation module 4 monitors whether the driver 3 is distracted or mentally absent in a manner that they cannot control the motor vehicle 1 in a safe manner. For example, it is monitored whether the driver is becoming tired, makes a telephone call, senses pain or gets a health problem for some reason, etc.

The roadworthiness evaluation module 4 further functions to estimate in what driving situations and with which vehicle settings the driver 3 feels good and confident. This can be used for a pre-selection of operator persons 14 suitable for the driver 3. For example, when a driver 3 prefers a rather gentle driving style, operator persons 14 having a conservative driving style will be appropriate for him.

The wellbeing and the confidence of the driver 3 can be measured by the analysis of information such as, e.g., camera images and noises of the driver 3 which are obtained by means of the sensors 33, e.g. by analysis of the facial expression, expression of the eyes, the heartbeat, the rhythm of breathing, the voice etc.

The results obtained in the roadworthiness evaluation module 4 are supplied to a driver preference extraction module 34 which also receives status data from the vehicle status module 11. The driver preference extraction module 34 obtains characteristic driving situation patterns from status data such as, e.g., vehicle acceleration, vehicle speed, preferred radio stations, preferred temperature settings etc.

The driver preference extraction module 34 then correlates the current condition of the driver 3 with certain driving situations and vehicle conditions. By means of continuous correlation analysis, the driver preference extraction module 34 can identify certain preferences of the driver 3 in time and store them in the driver preference memory 7. The driver preference memory 7 can be located in the motor vehicle 1 or at a remote location on a server. In the latter case, a radio link is required between the driver preference memory 7, the vehicle status module 11 and the driver preference extraction module 34.

Figure 4:
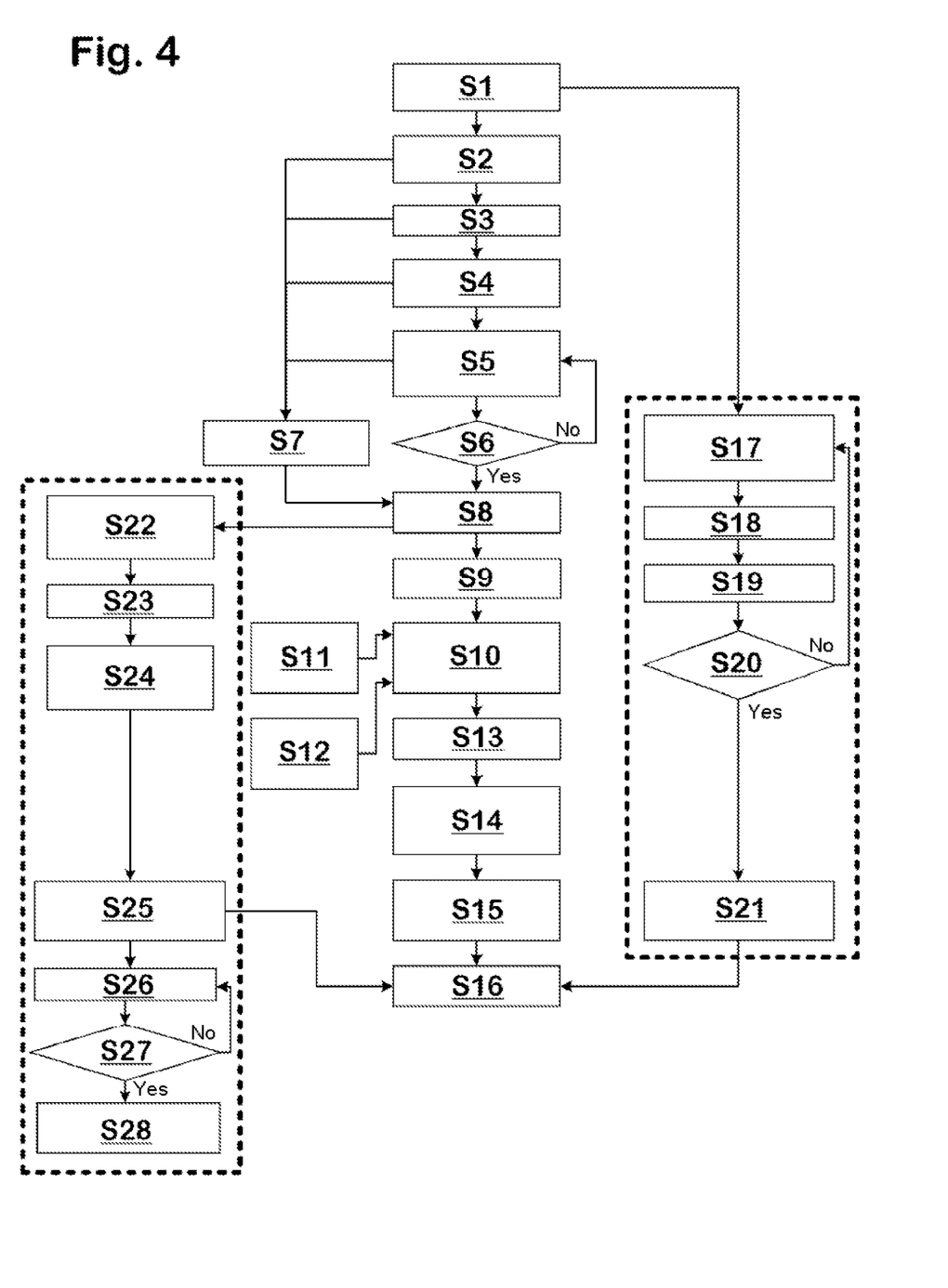
FIG. 4 shows a flowchart for illustrating an example of a process for requesting remote monitoring or remote control, respectively, of a motor vehicle and for selecting an operator.

The flowchart of FIG. 4 illustrates the operating principle of a request for remote monitoring or remote control, either manually by the driver 3 of a motor vehicle 1 or by the roadworthiness evaluation module 4 which determines that the driver 3 is too distracted or preoccupied for safely controlling the motor vehicle 1, e.g. because he has fallen asleep.

In step S1, the part of the remote monitoring and remote control system located in the motor vehicle is switched off and can be switched on by the driver in step S2. After the switch-on, the driver is monitored in step S3 and capabilities and preferences of the driver are determined or updated and stored in step S4, as described above.

In step S5, the degree of distraction or preoccupation of the driver is monitored, e.g. stress, fatigue or temporary incapability of controlling the motor vehicle. In step S6, it is checked whether the degree of distraction or preoccupation of the driver is critical. If the result of the test is No, step S5 is repeated.

If the result of the test in step S6 is Yes, or if during any one of steps S2-S5 the driver himself has requested remote monitoring or remote control (step S7), a process for selecting an operator from a plurality of operator persons who are located at remote locations begins in step S8.

For this purpose, the stored capabilities and preferences such as, e.g., driving styles, local knowledge etc. of prospective operator persons are acquired in step S9 and checked in step S10 for correspondences with the results obtained in the roadworthiness evaluation module 4 in order to make a pre-selection of operator persons. As an alternative or additionally, the pre-selection can be made by means of preferences of the driver obtained in step S11 such as, e.g., hobbies or certain persons such as, e.g., friends, parents or acquaintances who will be allowed to remotely monitor or remotely control the motor vehicle. As an alternative or additionally, the pre-selection can be made by means of capabilities of the driver, obtained in step S12, such as, e.g., preferred driving style.

In step S10, an inquiry for taking over remote monitoring or remote control is sent to all preselected operator persons, which inquiry can be confirmed or rejected by every operator person. Operator persons who confirm within a time limit that they will be available for remote monitoring or remote control (step S13) are reported to the driver of the motor vehicle (step S14), e.g. in the form of a shortlist with point numbers for qualification and/or for the correspondences checked in step S10. In step S15, the driver selects one of the operator persons who have confirmed the inquiry and in step S16, the operator selection process is ended.

An alternative process for an emergency operator is shown to the right of the process described previously (in a box bordered dashed). In this context, the part of the remote monitoring and remote control system located in the motor vehicle can be switched on remotely by an authorized operator person even if the system is switched off in step S1.

In step S17, the authorized operator person requests a remote monitoring or remote control of the motor vehicle. After authentication of the operator in step S18 and the validity check in step S19 with respect to the current driving style and condition of the driver in the motor vehicle for detecting a critical situation, it is checked in step S20 whether a critical situation has been detected. If No, the process returns to step S17. If Yes, authorized operator person is selected automatically as operator in step S21 and in step S16, the operator selection process is ended. This alternative process enables certain persons, for example parents of adolescent beginner drivers who often tend to a risky driving style especially in the case of tiredness or under the influence of alcohol, to remove control of the motor vehicle from their child and, instead, to take it over themselves.

Another alternative process for the selection of an operator is shown on the left of the process described before (in a box bordered dashed). This process can be performed when the driver of the motor vehicle agrees to hand the remote monitoring or remote control not to a person but to a driving agent program 15 as described further above with reference to FIG. 1.

This agreement can be given by the driver, e.g., in the above step S8 whereupon the process proceeds with step S22 in which the process for selecting a driving agent program as operator begins. In step S23, the location of the motor vehicle is determined, e.g. as GPS coordinates by satellite navigation. In step S24, a driving agent program allocated to the geographic region in which the motor vehicle is located is determined. In step S25, this driving agent program is selected as operator and in step S16, the operator selection process is ended.

In step S26, the location of the motor vehicle is monitored further and, if it is found in step S27 that the motor vehicle has moved to a different geographic region to which another driving agent program is allocated, the control of the motor vehicle is handed over to the new driving agent program in step S28. The driving agent programs responsible in each case for a particular geographic region can be optimized for certain routes and if there are a number of responsible driving agent programs for a particular geographic region, these can exchange information with one another in order to achieve synergies.

Figure 5:
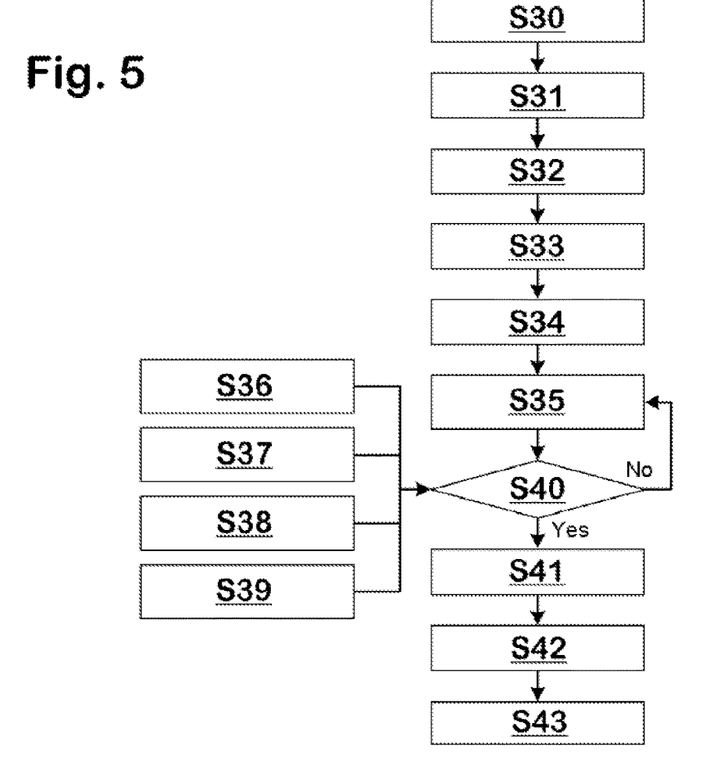
FIG. 5 shows a flowchart for illustrating an example of a process for handing over vehicle control to a selected operator and for ending remote-controlled driving.

FIG. 5 shows a flowchart for explaining an example of a process for the seamless transfer of the vehicle control from a driver of a motor vehicle to a selected operator and for ending the remote-controlled driving operation. It is especially during the transfer but also during the remote control itself that the data communication link between the remote operator and the motor vehicle or its control and monitoring facilities must be reliable. In order to ensure that the link is available continuously, redundant radio links can be provided, e.g. two parallel radio links.

The process shown in FIG. 5 follows step S16 of the operator selection process of FIG. 4. After step S16, the handover of vehicle control to remote control by the selected operator is prepared and in step S31, a reliable radio link is secured. In step S32, the system switches over to remote control by the operator and the driver is informed of this. During the handover, suitable driver assistance systems such as, e.g., tracking assistant, adaptive cruise control etc. can be temporarily activated which keep the motor vehicle in motion uniformly and continuously. This terminates the handover of vehicle control to remote control (step S33) and thereafter, only the operator controls the motor vehicle (step S34).

In order to be able to end the remote-controlled driving operation when this becomes necessary, it is continuously monitored in step S35 whether there is a requirement for ending the remote-controlled driving operation. It may be that the remote-controlled driving operation has reached a planned end in time or space (step S36), e.g. a booked driving time or route or a driving destination. It may also be that the driver would like to receive control of his motor vehicle back for some reason (step S37). It may also be that the operator would like to hand back control of the motor vehicle for some reason (step S38). It may also be that some emergency situation occurs (step S39), e.g. if the communication link is impaired because of a malfunction of the hardware or overloading or if there is some fault condition in the motor vehicle like, e.g., engine failure, transmission failure, wheel damage, lack of fuel etc. In some such cases, it may be determined that it will probably be better if the driver receives control of the motor vehicle back.

As long as it is found in step S40 that there is no requirement for ending the remote-controlled driving operation, steps S35 and S40 are performed repeatedly. If it is found in step S40 that there is a requirement for ending the remote-controlled driving operation, the (inactive) driver of the motor vehicle is alerted in step S41, where the type or intensity of the alarm can depend on the reason for the termination. The more critical the reason for ending the remote-controlled driving operation is, the more intensive is the alarm. In step S42, driver assistance systems such as, e.g., tracking assistant, adaptive cruise control etc. can be activated temporarily in order to keep the motor vehicle uniformly in motion. In step S43, the remote-controlled driving operation is ended and the driver of the motor vehicle again has full and sole control of his vehicle.

Figure 6:
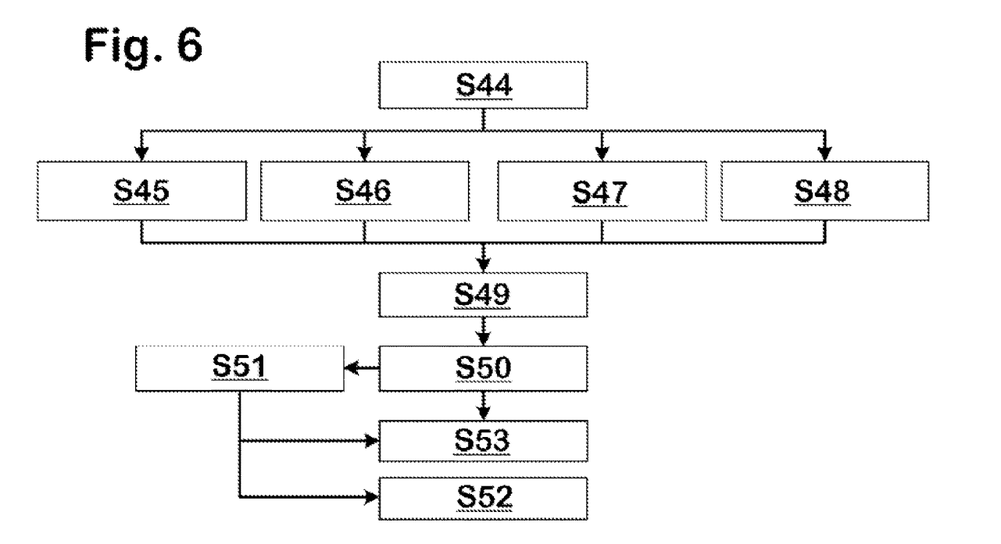
FIG. 6 shows a flowchart for illustrating an example of a process for evaluating operator persons and for paying for remote control services.

FIG. 6 shows a process for evaluating operator persons 14 by means of the operator evaluation module 9 and for accounting for remote control services by means of the accounting module 12.

After the start of a remote monitoring and remote control session in step S44, a number of criteria are monitored simultaneously for evaluating the operator person remotely controlling the motor vehicle, namely in step S45 the adherence to traffic rules, in step S46 the quality of the driving style, in step S47 the adherence to preferences of the (inactive) driver of the motor vehicle and his requirements for the operator person (e.g. that during the session, he should exclusively handle the driving of the motor vehicle, should not drive at more than 120 km/h and the like), and in step S48 the health-related state of the operator person and/or the degree of attention which the operator has paid to his task.

All these criteria are observed during the remote-controlled driving (step S49). After a remote monitoring and remote control session has ended in step S50, a measure for evaluating the operator person is calculated by means of these criteria in step S51 and by means of this measure, a stored operator profile is updated (step S52). The measure for evaluating the operator person can also have an influence on the accounting in step S53 which is performed after the monitoring and control session has ended.

The remote monitoring and remote control system is designed as a payment service accounted for after being used which can be performed on a voluntary basis by operator persons who have certain abilities, similar to taxi drivers. The driver who lets himself be monitored or driven by an operator person therefore pays a corresponding amount which is then handed to the operator person minus an appropriate proportion for the system operators and payment handlers. The accounting can take place in accordance with any known method, e.g. credit card reader in the motor vehicle, Internet accounting, etc. The final price could be reduced if the evaluation of the operator person shows that he has not met the requirements of his responsibility, e.g. was too tired, was also occupied with other things than remote monitoring or remote control, has driven too fast, has driven too jerkily, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for remote monitoring of motor vehicle operation comprising:
   computer equipment integrated within a vehicle initiating a request, in response to the computer equipment detecting a predefined health-related state of a driver, for remote driving control of the vehicle;
   a control terminal in wireless communication with the equipment to receive the request, transmit an offer to perform the remote driving control, and perform the remote driving control after acceptance of the offer by the vehicle; and
   a coordination unit remote from the equipment and the terminal responsive to acceptance of the offer, receiving and then transmitting remote driving commands from a remote operator to the computer equipment to control driving of the vehicle responsive to acceptance of the offer.

2. The apparatus of claim 1, wherein the remote operator is an operator person.

3. The apparatus of claim 2, wherein the control terminal is further configured to evaluate a performance of the operator person.

4. The apparatus of claim 3, wherein the control terminal is further configured to determine a payment for services provided by the operator person based on the performance of the operator person.

5. The apparatus of claim 1, wherein the remote operator is a driving agent program.

6. The apparatus of claim 1, wherein the control terminal is further configured to automatically handle payment for services provided by the remote operator.

* * * * *